US012780063B2

(12) United States Patent
Yasuda et al.

(10) Patent No.: US 12,780,063 B2
(45) Date of Patent: Nov. 3, 2026

(54) VEHICLE SEAT

(71) Applicants: NHK SPRING CO., LTD., Yokohama (JP); SUBARU CORPORATION, Tokyo (JP)

(72) Inventors: Kenzo Yasuda, Yokohama (JP); Kazuhiro Toyoshima, Yokohama (JP); Yosuke Ishiyama, Tokyo (JP); Masato Fukushima, Tokyo (JP); Takahide Takeuchi, Tokyo (JP); Kento Koshiishi, Tokyo (JP)

(73) Assignees: NHK SPRING CO., LTD., Kanagawa (JP); SUBARU CORPORATION, Tokyo (JP)

( * ) Notice: Subject to any disclaimer, the term of this patent is extended or adjusted under 35 U.S.C. 154(b) by 135 days.

(21) Appl. No.: 18/811,155

(22) Filed: Aug. 21, 2024

(65) Prior Publication Data

US 2025/0074275 A1 Mar. 6, 2025

(30) Foreign Application Priority Data

Aug. 30, 2023 (JP) ................................ 2023-140574

(51) Int. Cl.
*B60N 2/02* (2006.01)
*B60N 2/56* (2006.01)
*B60N 2/58* (2006.01)

(52) U.S. Cl.
CPC ............. *B60N 2/58* (2013.01); *B60N 2/0284* (2013.01); *B60N 2/5621* (2013.01); *B60N 2/5642* (2013.01); *B60N 2/5657* (2013.01)

(58) Field of Classification Search
CPC .. B60N 2/0284; B60N 2/5621; B60N 2/5642; B60N 2/5657
See application file for complete search history.

(56) References Cited

U.S. PATENT DOCUMENTS

| | | | | |
|---|---|---|---|---|
| 6,179,706 | B1 * | 1/2001 | Yoshinori ............ | B60N 2/5657 297/180.14 |
| 6,481,801 | B1 * | 11/2002 | Schmale .............. | B60N 2/5635 297/180.12 |
| 7,108,319 | B2 * | 9/2006 | Hartwich ............. | B60N 2/5635 297/180.16 |

(Continued)

FOREIGN PATENT DOCUMENTS

| | | | | |
|---|---|---|---|---|
| JP | 2007050134 | A | * | 3/2007 |
| JP | 2020-090268 | A | | 6/2020 |
| JP | 2025034283 | A | * | 3/2025 |

*Primary Examiner* — Rodney B White
(74) *Attorney, Agent, or Firm* — Knobbe, Martens, Olson & Bear, LLP

(57) ABSTRACT

In a vehicle seat, a flow path is formed between a pad main body of a seat cushion pad and a seal member, with the flow path reaching to an opposing face of the pad main body opposing the slide pad, and air inside the flow path being moved by an air moving machine. A seat cushion cover includes a porous cover main body portion covering the pad main body, and a movable cover portion that is positioned between the pad main body and the slide pad and that is deformed by sliding the slide pad. The seat cushion cover includes a close-off cover portion that closes off a gap between an end portion on the slide pad side of the seal member and the cover main body portion.

7 Claims, 11 Drawing Sheets

(56) References Cited

U.S. PATENT DOCUMENTS

| | | | | |
|---|---|---|---|---|
| 7,857,395 | B2 * | 12/2010 | Kikuchi | B60N 2/5657 297/452.47 |
| 9,039,085 | B2 * | 5/2015 | Aselage | B60N 2/0284 297/284.3 |
| 9,707,875 | B2 * | 7/2017 | Abe | B60N 2/58 |
| 10,124,705 | B2 * | 11/2018 | Abe | B60N 2/56 |
| 10,286,818 | B2 * | 5/2019 | Line | B60N 2/99 |
| 10,752,140 | B2 * | 8/2020 | Abe | B60N 2/70 |
| 11,135,949 | B2 * | 10/2021 | Okimura | A47C 7/74 |
| 11,325,509 | B2 * | 5/2022 | Panchani | B60N 2/0284 |
| 11,458,870 | B2 * | 10/2022 | Abe | B60N 2/56 |
| 11,571,998 | B2 * | 2/2023 | Binner | B60N 2/20 |
| 11,647,844 | B2 * | 5/2023 | Yonezawa | A47C 27/144 297/452.47 |
| 11,787,317 | B2 * | 10/2023 | Abe | B60N 2/5642 297/452.47 |
| 11,850,982 | B2 * | 12/2023 | Okimura | A47C 27/15 |
| 11,938,845 | B2 * | 3/2024 | Kimbara | B60N 2/58 |
| 12,377,764 | B2 * | 8/2025 | Palmer | B60N 2/5833 |
| 12,552,303 | B2 * | 2/2026 | Wang | B60N 2/5685 |
| 2022/0072981 | A1 * | 3/2022 | Panchani | B60N 2/0284 |
| 2024/0174144 | A1 * | 5/2024 | Nakazono | A47C 7/185 |
| 2024/0208383 | A1 * | 6/2024 | Wang | B60N 2/5685 |

* cited by examiner

VEHICLE SEAT

CROSS-REFERENCE TO RELATED APPLICATION

This application is based on and claims priority under 35 USC 119 from Japanese Patent Application No. 2023-140574 filed on Aug. 30, 2023, the disclosure of which is incorporated by reference herein.

BACKGROUND

Technical Field

The present disclosure relates to a vehicle seat.

Related Art

A transport seat with an air conditioner function is disclosed in Japanese Patent Application Laid-Open (JP-A) No. 2020-90268. A flow path is formed in a cushion pad of this transport seat on the opposite side of the cushion pad to a seating surface, and also plural through holes opening onto the seating surface are in communication with the flow path. Air is sucked in from the plural through holes when a suction device connected to the flow path is operated, in a configuration in which the thighs and buttocks of a seated person are cooled.

SUMMARY

However, in a vehicle seat having an adjustable front-rear direction length of a seat cushion, a slide pad (extension pad) configuring a front section of the seat cushion pad is slid in a seat front-rear direction so as to approach or move away from a pad main body of the seat cushion pad. In the vehicle seat provided with such a slide pad, the flow path for air conditioning is only formed to the pad main body, and so there is an issue that a flow of air onto the occupant is unable to be caused to be felt at the slide pad side.

In consideration of the above circumstances, an object of the present disclosure is to obtain a vehicle seat that is capable of making a flow of air onto an occupant be felt even at a slide pad side.

A vehicle seat of a first aspect of the present disclosure includes a pad main body configuring part of a pad that supports an occupant with a seating surface, a slide pad that configures another part of the pad, and that approaches or moves away from the pad main body by sliding in a direction oriented along the seating surface, a seal member that is provided on an opposite side of the pad main body from the seating surface, and that forms a flow path between the seal member and the pad main body reaching to an opposing face of the pad main body opposing the slide pad, an air moving machine that moves air inside the flow path, and a cover that covers the pad main body and the slide pad, that includes a porous cover main body portion covering the pad main body, and a movable cover portion that is positioned between the pad main body and the slide pad and that is deformed by the sliding. The cover includes a close-off cover portion that closes off a gap between an end portion on a slide pad side of the seal member and the cover main body portion.

In the vehicle seat of the first aspect, an occupant is supported by the seating surface of the pad. Part of the pad is configured by the pad main body, and another part of the pad is configured by the slide pad. The slide pad approaches or moves away from pad main body by sliding in a direction oriented along the seating surface. The seal member is provided at the pad main body at the opposite side to the seating surface. The seal member forms a flow path between the seal member and the pad main body reaching to an opposing face of the pad main body opposing the slide pad. Air inside this flow path is moved by the air moving machine. The pad main body and the slide pad are covered by the cover. The cover includes the porous cover main body portion covering the pad main body, and the movable cover portion that is positioned between the pad main body and the slide pad and that is deformed by the sliding.

A gap between the pad main body and the slide pad communicates a space on the occupant side with the flow path via the cover main body portion of the cover. This means that by operating the air moving machine, a flow of air onto the occupant can be caused to be felt even at the slide pad side. Moreover, the above cover includes the close-off cover portion that closes off the gap between the end portion on the slide pad side of the seal member and the cover main body portion. This thereby enables unnecessary air movement through the gap to be prevented.

A vehicle seat of a second aspect is the first aspect, wherein a one-end portion of the close-off cover portion is stitched together with a sewn seam where the cover main body portion and the movable cover portion are stitched together.

In the vehicle seat of the second aspect the one-end portion of the close-off cover portion of the cover is stitched together with the sewn seam where the cover main body portion and the movable cover portion of the cover are stitched together, enabling a reduction in stitching work.

A vehicle seat of a third aspect is the first aspect or the second aspect, wherein an other-end portion of the close-off cover portion is anchored using an anchor fixing to a wire embedded in the pad main body.

In the vehicle seat of the third aspect, the other-end portion of the close-off cover portion of the cover is anchored using the anchor fixing to the wire embedded in the pad main body, and so the other-end portion of the close-off cover portion can be strongly anchored to the pad main body.

A vehicle seat of a fourth aspect is the third aspect, wherein an other-end portion of the close-off cover portion is anchored using a surface fastener to the seal member.

In the vehicle seat of the fourth aspect, the other-end portion of the close-off cover portion of the cover is anchored using the surface fastener to the seal member, and so a task to anchor the other-end portion of the close-off cover portion to the seal member can be performed easily.

A vehicle seat of a fifth aspect is any one of the first aspect to the fourth aspect, wherein the pad is a seat cushion pad provided at a seat cushion for supporting buttocks and thighs of a seated occupant, and the slide pad is disposed at a seat front side with respect to the pad main body, and slides along a seat front-rear direction with respect to the pad main body.

In the vehicle seat of the fifth aspect, the buttocks and thighs of the occupant seated on the seat cushion are supported by the seating surface of the seat cushion pad. The slide pad of the seat cushion pad is disposed at the seat front side with respect to the pad main body of the seat cushion pad, and is slid along the seat front-rear direction with respect to the pad main body. This thereby enables the front-rear direction length of the seat cushion to be adjusted according to occupant build or the like.

As described above, the vehicle seat according to the present disclosure enables a flow of air onto an occupant to be caused to be felt even on a slide pad side.

BRIEF DESCRIPTION OF THE DRAWINGS

Exemplary embodiments of the present invention will be described in detail based on the following figures, wherein.

DETAILED DESCRIPTION

Figure 1:
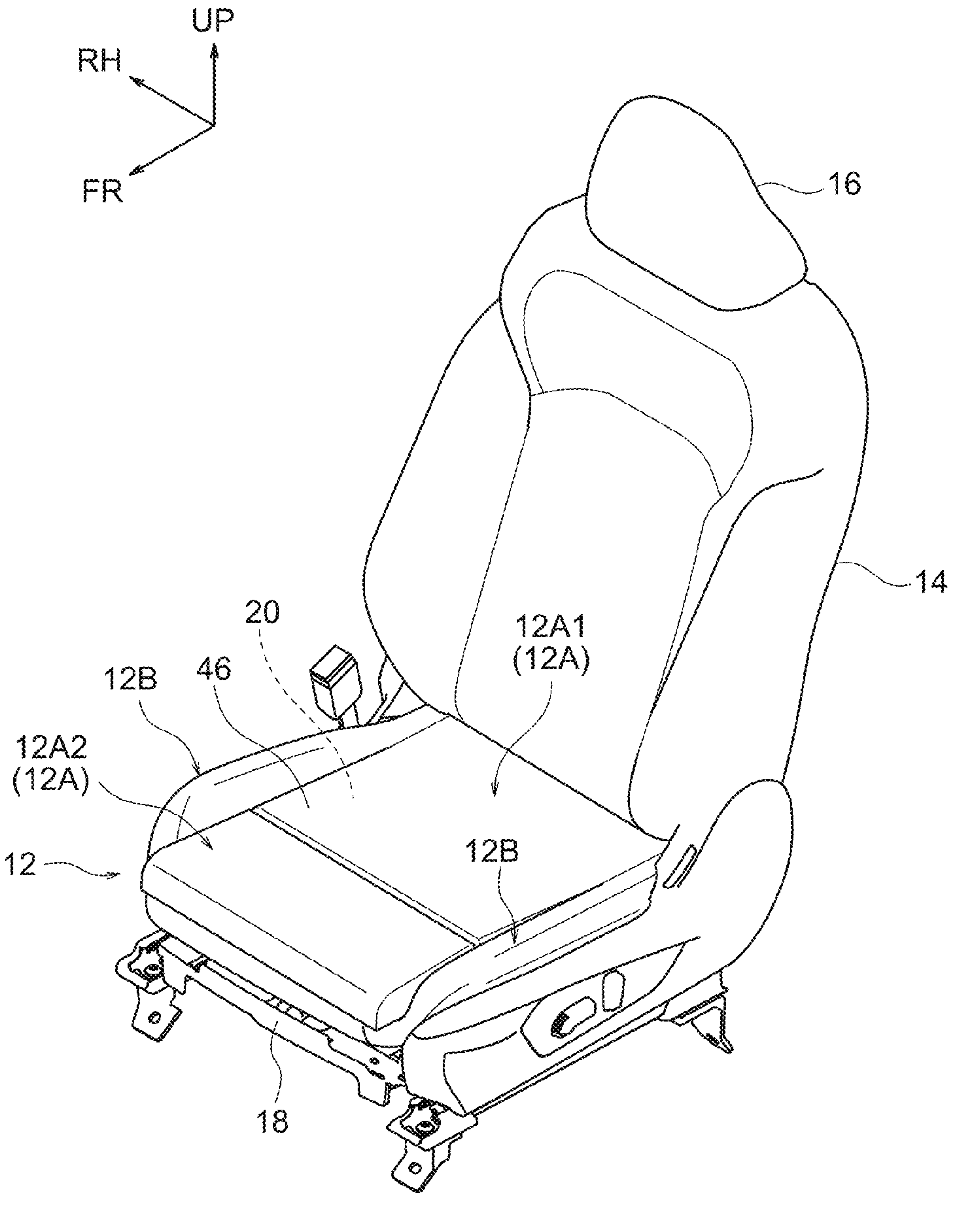
FIG. 1 is a perspective view illustrating a vehicle seat according to an exemplary embodiment.

Description follows regarding a vehicle seat 10 according to an exemplary embodiment of the present disclosure, with reference to FIG. 1 to FIG. 8. Note that sometimes reference numerals of some portions are omitted in the drawings in order to facilitate looking at the drawings. Note that as appropriate in the drawings, arrows FR, RH, UP respectively indicate forward, rightward, and upward directions of the vehicle seat 10. When in the following reference is simply made to front and rear, left and right, and up and down directions, then these indicate directions with respect to the vehicle seat 10.

As illustrated in FIG. 1, the vehicle seat 10 according to the present exemplary embodiment includes a seat cushion 12 that supports the buttocks and thighs of an occupant, a seatback 14 that supports the back of the occupant, and a headrest 16 that supports the head of the occupant. The seat cushion 12 includes a seat cushion frame 18 that is a framework member, a seat cushion pad (pad) 20 that is a pad member, and a seat cushion cover 48 that is a cover covering the seat cushion pad 20.

The seat cushion frame 18 is, for example, configured from metal. The seat cushion pad 20 is, for example, configured from a foam body, such as urethane foam or the like, and covers the seat cushion frame 18 from an upper side thereof. The seat cushion cover 48 is, for example, formed in a bag shape by sewing plural pieces of cover made from a cloth material, leather, synthetic leather, or the like together, and covers the seat cushion pad 20 from an upper side thereof.

Figure 2:
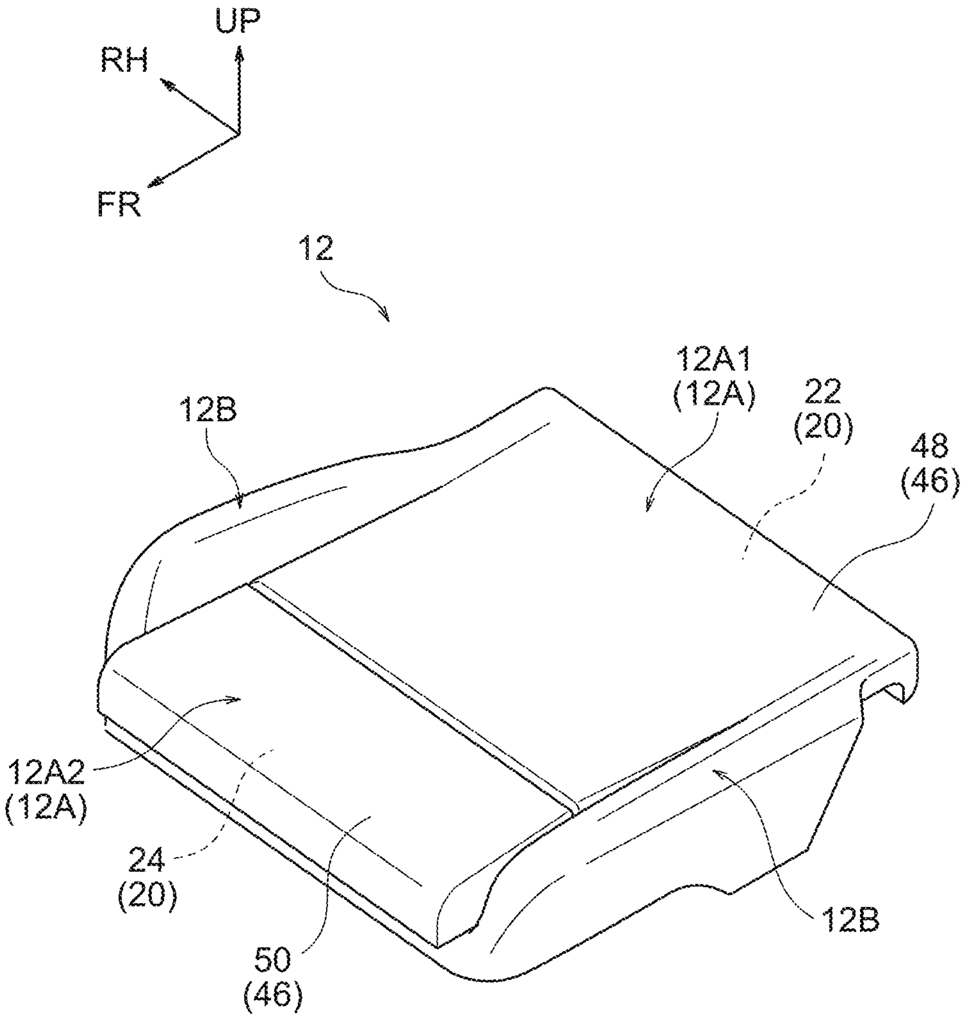
FIG. 2 is a perspective view illustrating a seat cushion of a vehicle seat according to an exemplary embodiment.

As illustrated in FIG. 2, a left-right direction central section of the seat cushion 12 configures a main section 12A that supports the buttocks and thighs of the occupant from a lower side thereof, and the two left-right direction side portions of the seat cushion 12 configure a left-right pair of side portions 12B that supports the buttocks and thighs of the occupant from the sides thereof. In the seat cushion 12, a front portion of the main section 12A configures a slide portion 12A2, and portions thereof other than the slide portion 12A2 configure a cushion main body 12A1.

The seat cushion pad 20 is divided into a pad main body 22 that configures a pad member of the cushion main body 12A1, and a slide pad (extension pad) 24 that configures a pad member of the slide portion 12A2. The pad main body 22 configures part of the seat cushion pad 20, and the slide pad 24 configures other parts of the seat cushion pad 20. An upper face 22A of the pad main body 22 and an upper face 24A of the slide pad 24 configure a seating surface 20A that supports the buttocks and thighs of the occupant.

The slide pad 24 is disposed at the front side with respect to the pad main body 22, and is supported from below by a cushion-length varying mechanism 26 (see FIG. 6 and FIG. 7). The cushion-length varying mechanism 26 is configured so as to cause the slide pad 24 to approach or move away from pad main body 22 by being slid in a front-rear direction by drive force such as a motor.

A cloth shaped insert sheet 32 is stuck to a lower face 20B on the opposite side of the pad main body 22 from the seating surface 20A. The insert sheet 32 is, for example, formed by integrally foam molding together with the pad main body 22. A seal member 34 is installed to a bottom side of the pad main body 22. The seal member 34 is, for example, configured with a rectangular plate shape from a non-metal, such as a non-woven fabric, press felt, or the like. An air moving machine 36 is disposed at a lower side of a rear portion of the seal member 34, with a through hole 35 formed in a rear portion of the seal member 34 in communication with a suction port of the air moving machine 36.

Figure 3:
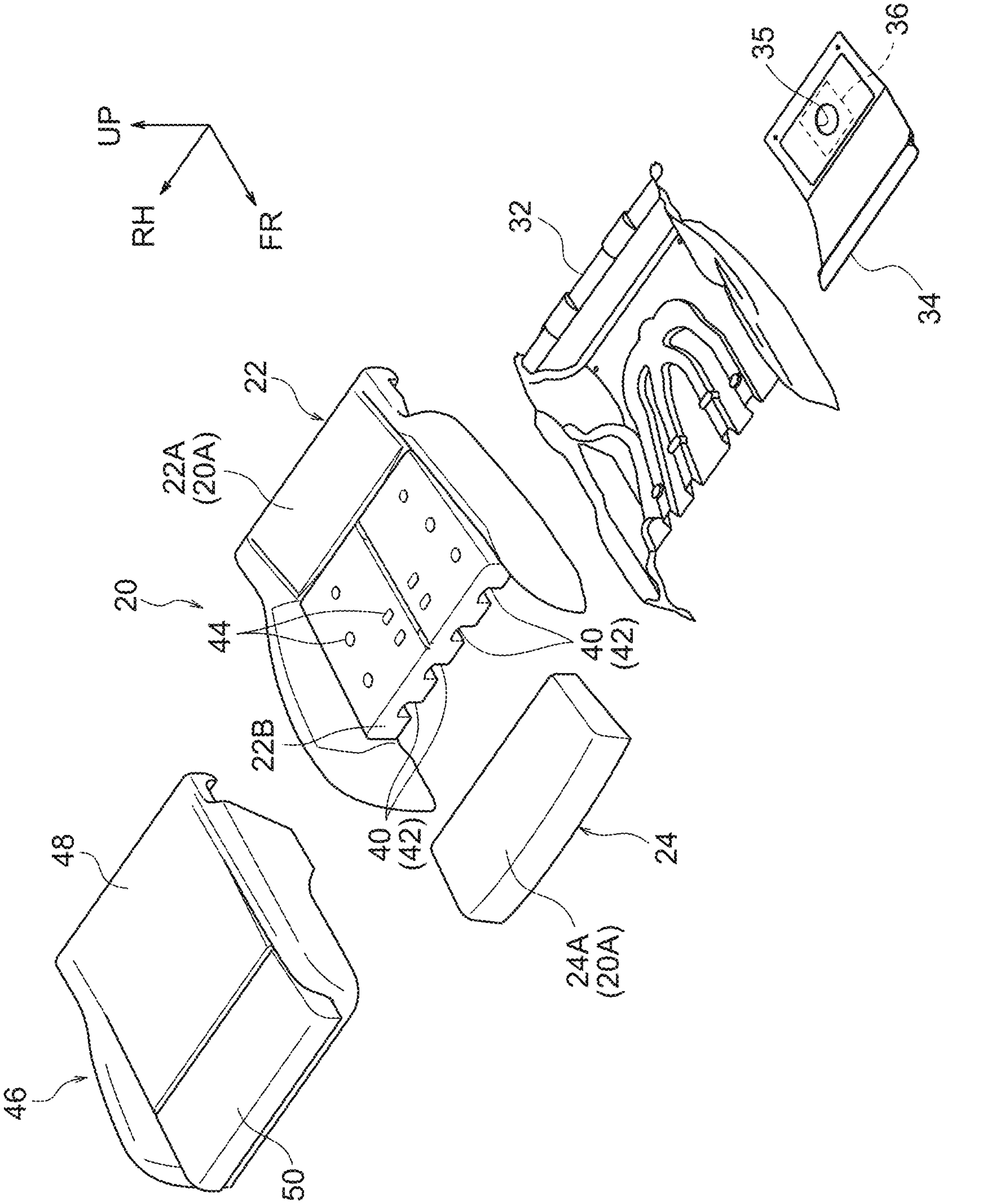
FIG. 3 is an exploded perspective view illustrating a configuration of part of a seat cushion.
Figure 4:
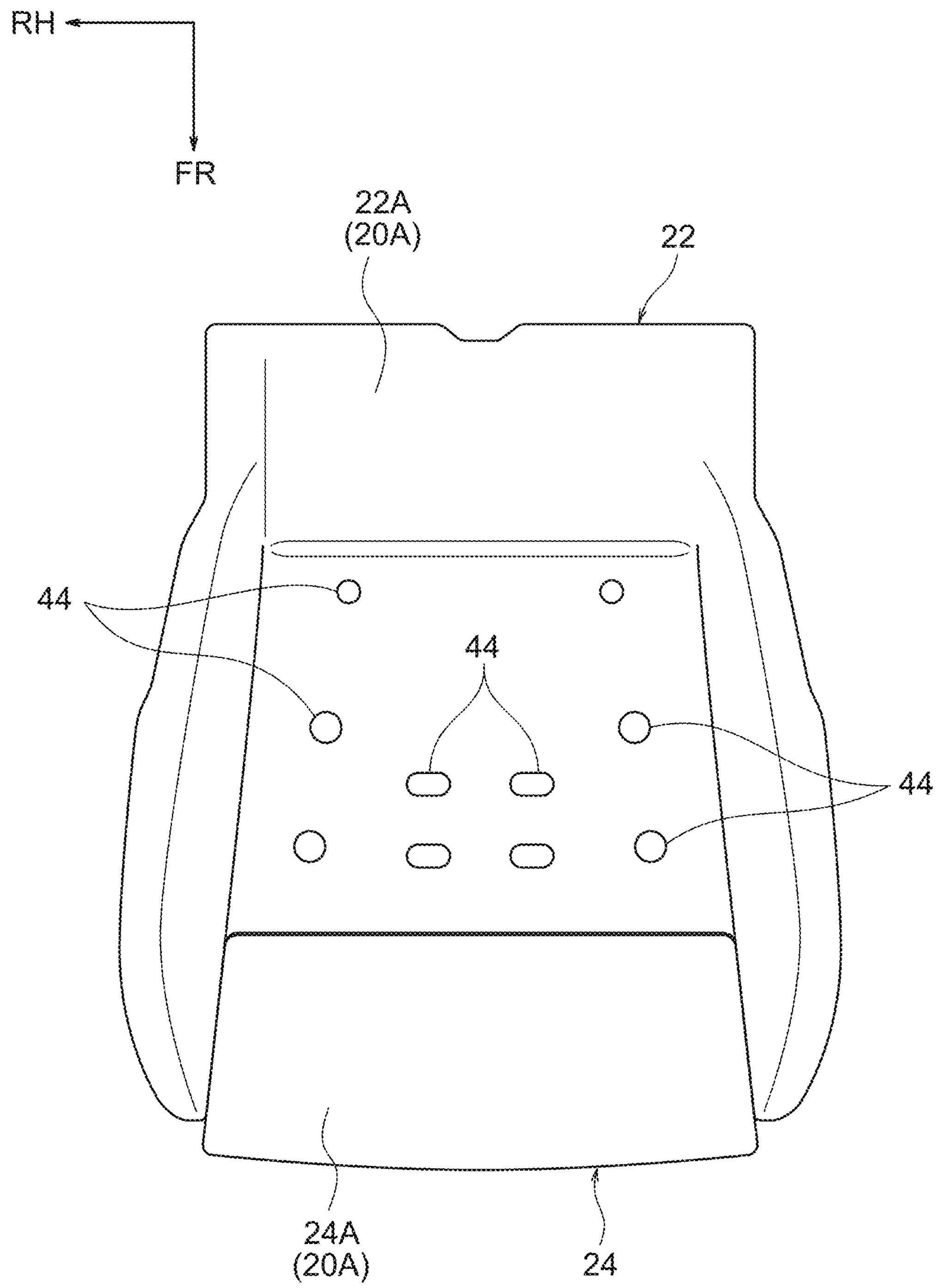
FIG. 4 is a plan view illustrating a seat cushion pad.
Figure 5:
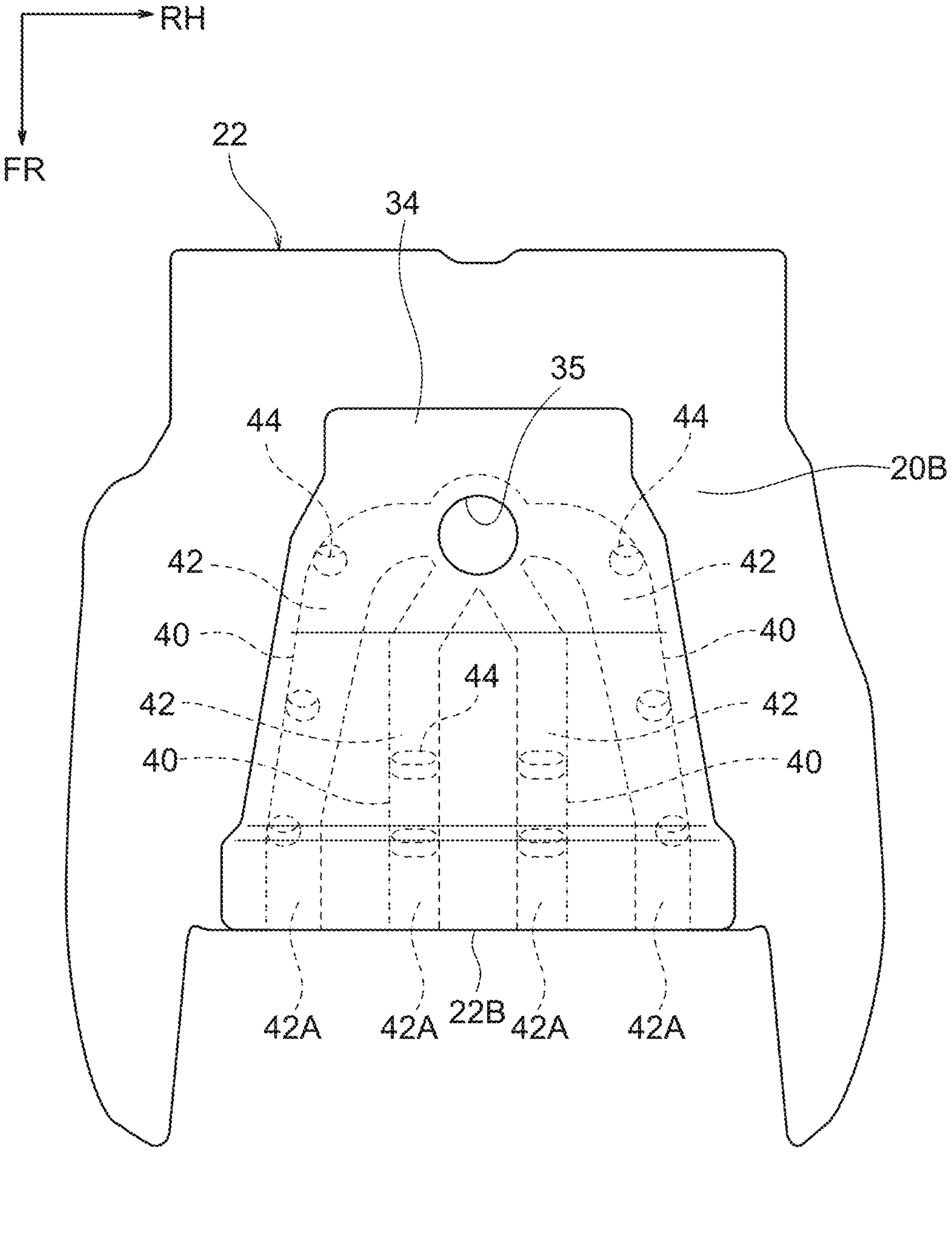
FIG. 5 is a bottom view illustrating a pad main body of a seat cushion pad.

As illustrated in FIG. 3 and FIG. 5, plural (in this case four) indentations 40 that are indented toward the upper face 22A side of the pad main body 22 are formed in the lower face 20B of the pad main body 22 so as to each run along the front-rear direction. The four indentations 40 are formed in the lower face of the pad main body 22 at a location configuring the main section 12A, and are arranged in a row along the left-right direction. The four indentations 40 extend from a rear portion of the pad main body 22 to a front portion side of the pad main body 22.

Rear ends of the four indentations 40 merge flow above the through hole 35 of the seal member 34. Front ends of the four indentations 40 reach as far as a lower portion of an opposing face 22B of the pad main body 22 that opposes the slide pad 24. The insert sheet 32 stuck to the lower face 20B of the pad main body 22 is molded so as to follow the profile of the four indentations 40, and the four indentations 40 are reinforced by the insert sheet 32. The seal member 34 disposed at the lower side of the pad main body 22 contacts the lower face of the pad main body 22 with the insert sheet 32 interposed therebetween, and the four indentations 40 are closed off by the seal member 34. This results in four flow paths 42 having closed cross-section structures being formed to a lower portion of the pad main body 22.

Plural through holes 44 are formed piercing through the pad main body 22 in an up-down direction at a location of the pad main body 22 configuring the main section 12A. Upper ends of the plural through holes 44 open onto the upper face (the seating surface 20A) of the pad main body 22, and the lower ends of the plural through holes 44 are each in communication with one or other of the four flow paths 42. The front ends of the four flow paths 42 are configured as vent holes 42A that reach to a lower portion of the opposing face 22B of the pad main body 22 that opposes the slide pad 24.

As illustrated in FIG. 1 to FIG. 3, and FIG. 6 to FIG. 7, a seat cushion cover 46 includes a cover main body portion 48 that covers the pad main body 22, a slide cover portion 50 that covers the slide pad 24, a movable cover portion 52 that is disposed between the slide pad 24 and the pad main body 22, an extension cover portion 54 that extends from a front end portion of the cover main body portion 48 to a lower side of the slide pad 24, and a close-off cover portion 56 that extends from a front end portion of the cover main body portion 48 to the lower side of the pad main body 22.

The cover main body portion 48, the slide cover portion 50, the movable cover portion 52, and the extension cover portion 54 are configured by stitching plural cover pieces together. The close-off cover portion 56 is, as an example, configured by a single cover piece. The plural cover pieces configuring the cover main body portion 48 serve as a main part and are configured from a porous cloth material, or from leather, synthetic leather, or the like formed with multiple vent holes. The cover main body portion 48 thereby has porosity. Note that the cover main body portion 48 may be configured by a thin and porous urethane film being laminated to a back face of each of the cover pieces described above.

Figure 6:
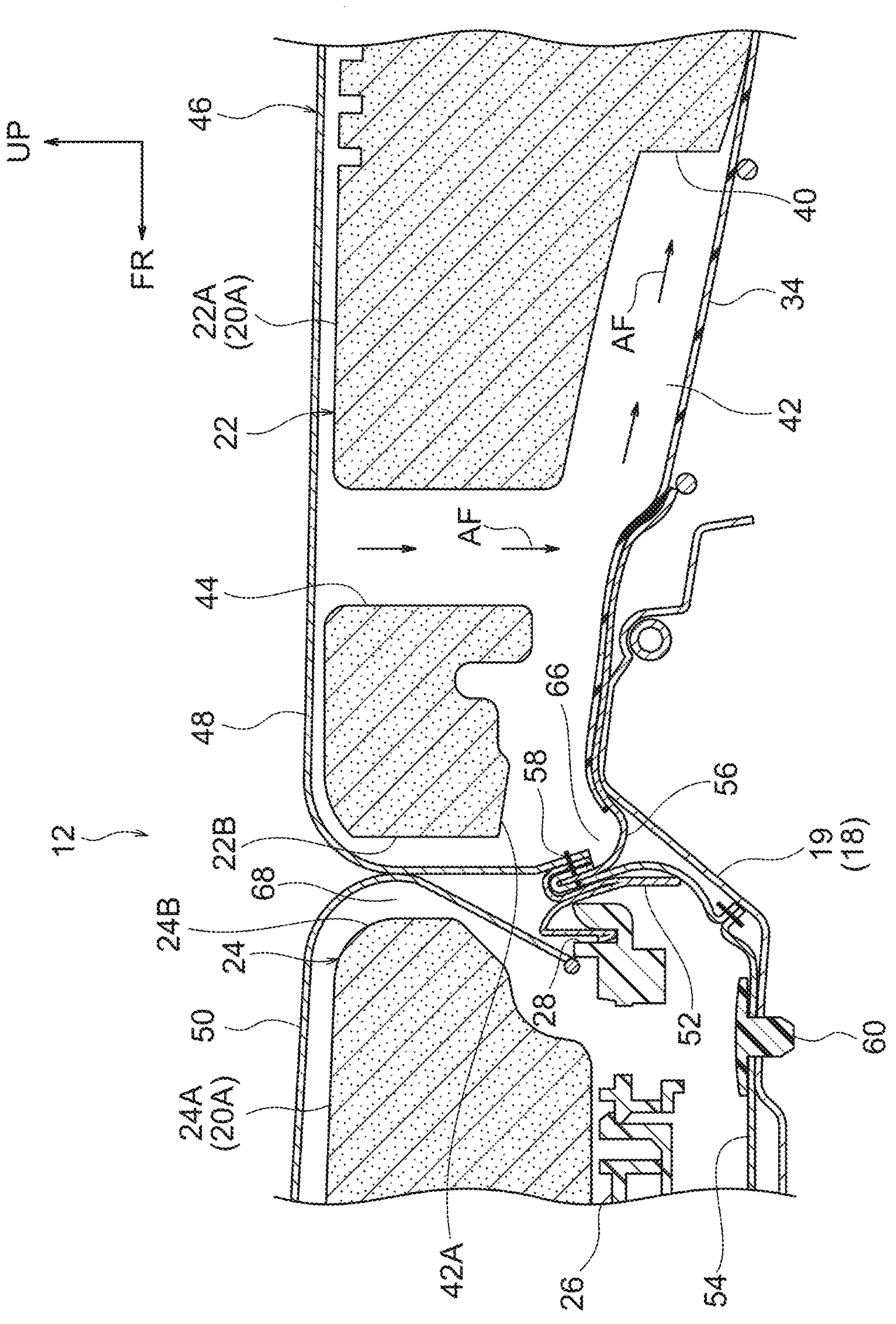
FIG. 6 is a cross-section illustrating a configuration of part of a seat cushion, and is a diagram illustrating a state in which a slide pad is positioned at a rearmost position of a slide range.
Figure 7:
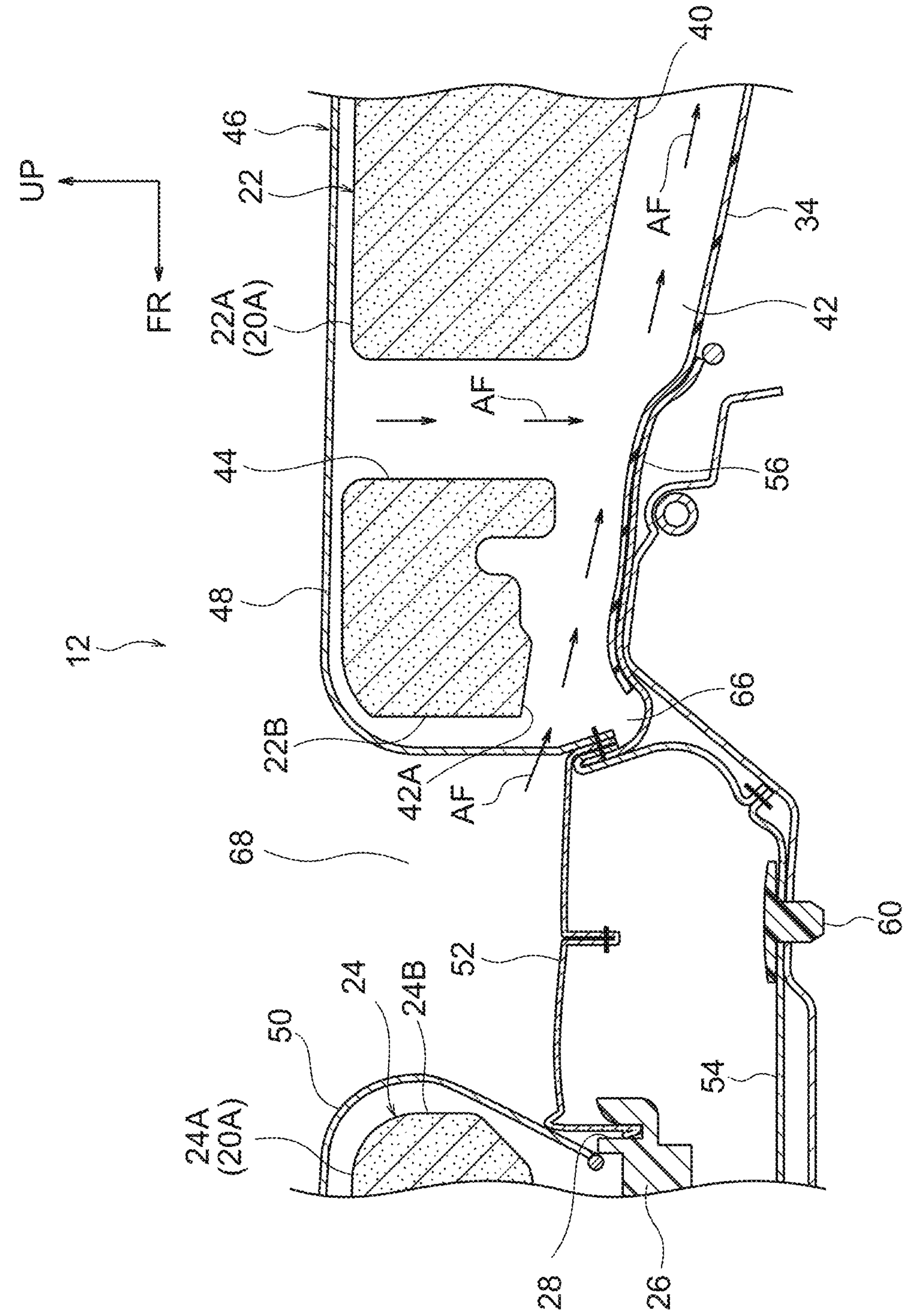
FIG. 7 is a cross-section corresponding to FIG. 6 and illustrating a slide pad of a seat cushion pad in a state positioned at a frontmost position of a slide range.

As illustrated in FIG. 6 and FIG. 7, a front end portion of the cover main body portion 48 is disposed in the vicinity of a lower end portion of the opposing face 22B of the pad main body 22 that opposes the slide pad 24. The rear end portion of the slide cover portion 50 is disposed in the vicinity of a lower end portion of an opposing face 24B of the slide pad 24 that opposes the pad main body 22. A rear end portion of the movable cover portion 52, a rear end portion of the extension cover portion 54, and a front end portion (one-end portion) of the close-off cover portion 56 are sewn together with the front end portion of the cover main body portion 48. Namely, the front end portion of the close-off cover portion 56 is sewn together with a sewn seam 58 where the front end portion of the cover main body portion 48, the rear end portion of the movable cover portion 52, and the rear end portion of the extension cover portion 54 are sewn together.

The front end portion of the movable cover portion 52 is fitted into and anchored in a groove portion 28 formed in a rear end portion of the cushion-length varying mechanism 26. The movable cover portion 52 deforms together with sliding of the slide pad 24, namely together with sliding of the slide portion 12A2. In a state in which the slide portion 12A2 is separated from the cushion main body 12A1, a gap between the cushion main body 12A1 and the slide portion 12A2 is configured so as to be closed off from a lower side thereof by the movable cover portion 52.

Figure 8:
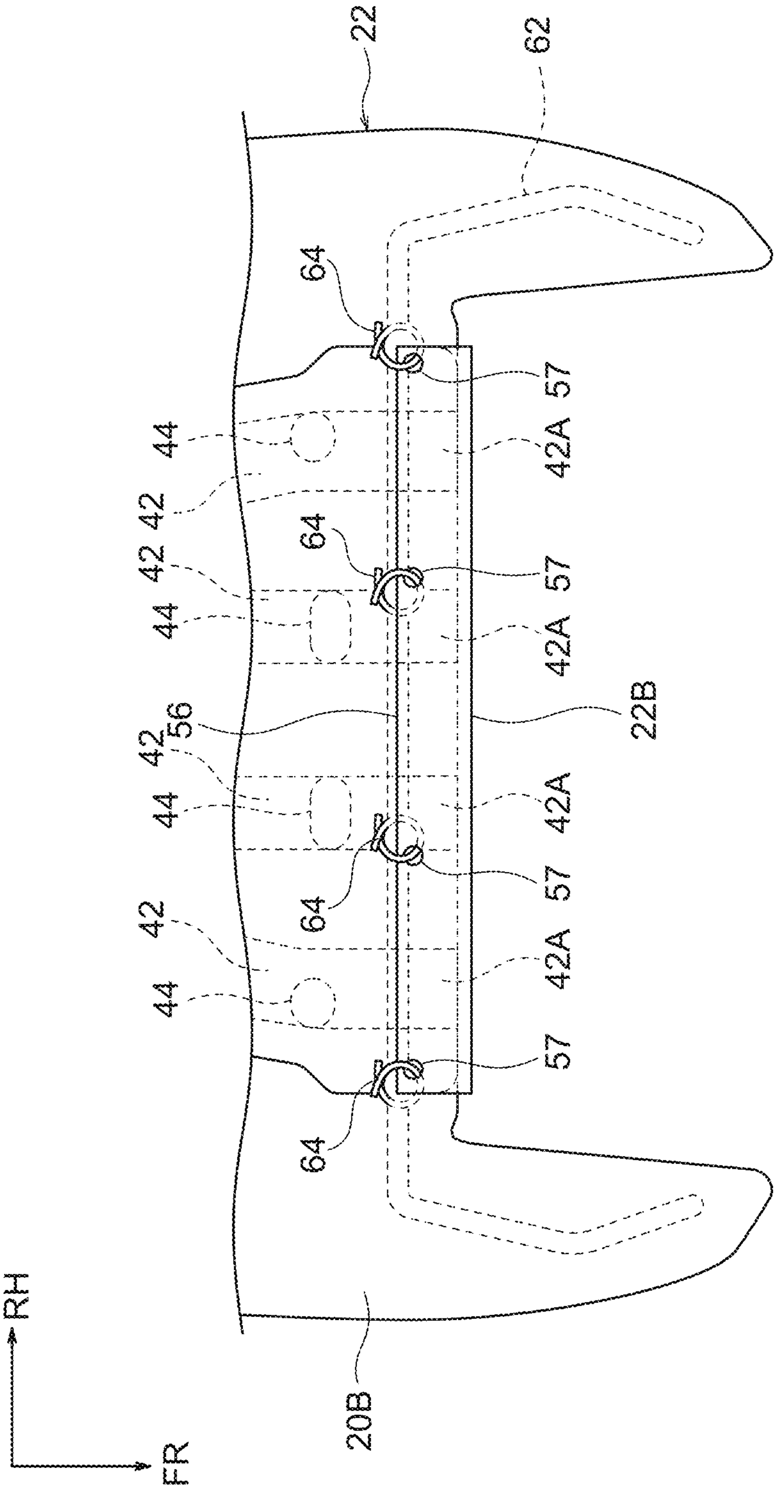
FIG. 8 is a bottom view illustrating a configuration of peripheral members and including a front section of a pad main body.

A front-rear direction intermediate portion of the extension cover portion 54 is anchored using a clip 60 to a pan frame section 19 that configures a front portion of the seat cushion frame 18. The close-off cover portion 56 extends to a lower side of the seal member 34, and is nipped between the front end portion of the seal member 34 and the rear end portion of the pan frame section 19. The rear end portion (other-end portion) of the close-off cover portion 56 is, as illustrated in FIG. 8, anchored using plural hog rings (anchor fixings) 64 with respect to a wire 62 embedded in a front end portion of the pad main body 22. Plural through holes 57 are formed in a rear end portion of the close-off cover portion 56, and each of the hog rings 64 that has been inserted into the respective through holes 57 is wound around the wire 62.

A gap 66 between the front end portion (end portion on the slide pad 24 side) of the seal member 34 and the front end portion of the cover main body portion 48 is closed off by the close-off cover portion 56. The gap 66 readily arises due to a front end portion of the cover main body portion 48 being pulled toward the front side by the movable cover portion 52, particularly in a state in which the slide portion 12A2 is separated from the cushion main body 12A1. The gap 66 is configured so as to also be blocked by the close-off cover portion 56 in the state described above.

As illustrated in FIG. 6, in a state in which the slide pad 24, namely the slide portion 12A2, has approached and is in close proximity to the pad main body 22, namely to the cushion main body 12A1, a space at the occupant side (the seating surface 20A side) is communicated with the four flow paths 42 via a gap 68 between the slide pad 24 and the pad main body 22, via the porous cover main body portion 48, and via the plural through holes 44. The air moving machine 36 disposed at the lower side of the seal member 34 is, as an example, a suction fan that by operating sucks in air from inside the four flow paths 42, and blows the air toward the lower side of the seat cushion 12. A negative pressure is thereby created inside the four flow paths 42. As a result thereof, occupant side air is drawn inside the four flow paths 42 through the vent holes 42A of the four flow paths 42 and through the plural through holes 44. The drawn-in air is then, after moving through the inside of the four flow paths 42, exhausted to the lower side of the seat cushion 12 by the air moving machine 36.

As illustrated in FIG. 7, a space on the occupant side is communicated with the four flow paths 42 via the gap 68, via the cover main body portion 48, and via the plural through holes 44 even in a state in which the slide pad 24, namely the slide portion 12A2, has separated from the pad main body 22, namely from the cushion main body 12A1, and in which the gap 68 between the slide pad 24 and the pad main body 22 has widened. When the air moving machine 36 is operated in this state, the occupant side air is drawn inside the four flow paths 42 via the vent holes 42A of the four flow paths 42 and via the plural through holes 44, and is exhausted to the lower side of the seat cushion 12. Note that the arrows AF indicate airflow in FIG. 6 and FIG. 7.

Note that in cases in which the air moving machine 36 is configured to blow air toward the inside of the four flow paths 42, this results in a configuration in which the air at the lower side of the seat cushion 12 is drawn into the four flow paths 42 and is exhausted to the occupant side via the four flow paths 42, via the plural through holes 44, and via the cover main body portion 48.

Next, description follows regarding the operation and advantageous effects of the present exemplary embodiment.

In the vehicle seat 10 configured as described above, the buttocks and thighs of the occupant seated on the seat cushion 12 are supported by the seating surface 20A of the seat cushion pad 20. The slide pad 24 of the seat cushion pad 20 approaches and moves away from the pad main body 22 by sliding in a front-rear direction that is oriented along the seating surface 20A. This thereby enables the front-rear direction length of the seat cushion 12 to be adjusted according to occupant build or the like. The pad main body 22 and the slide pad 24 are covered by the seat cushion cover 46. The seat cushion cover 46 includes the porous cover main body portion 48 that covers the pad main body 22, and the movable cover portion 52 positioned between the pad main body 22 and the slide pad 24 is deformed by the aforementioned sliding.

The seal member 34 is provided on the opposite side of the pad main body 22 from the seating surface 20A side. The seal member 34 is formed with the four flow paths 42 that are disposed between the seal member 34 and the pad main body 22 and that reach to the opposing face 22B of the pad main body 22 opposing the slide pad 24. This means that air inside the flow paths 42 is caused to flow by the air moving machine 36 and is exhausted to the lower side of the seat cushion 12. The plural through holes 44 opening onto the upper face 22A of the pad main body 22 are in communication with the four flow paths 42, and so the occupant side air is drawn into the four flow paths 42. This enables a flow of air to be felt at locations supported by the pad main body 22, i.e. by the buttocks and thighs of the occupant, thereby improving occupant comfort.

The gap 68 between the pad main body 22 and the slide pad 24 communicates the occupant side space with the four flow paths 42 via the cover main body portion 48. This means that the occupant side air is drawn through the front ends of the four flow paths 42 and through the plural through holes 44 to inside of the four flow paths 42 by the operation of the air moving machine 36, and is exhausted to the lower side of the seat cushion 12. As a result thereof, a flow of air onto the occupant can also be caused to be felt on the slide pad 24 side.

Figure 9:
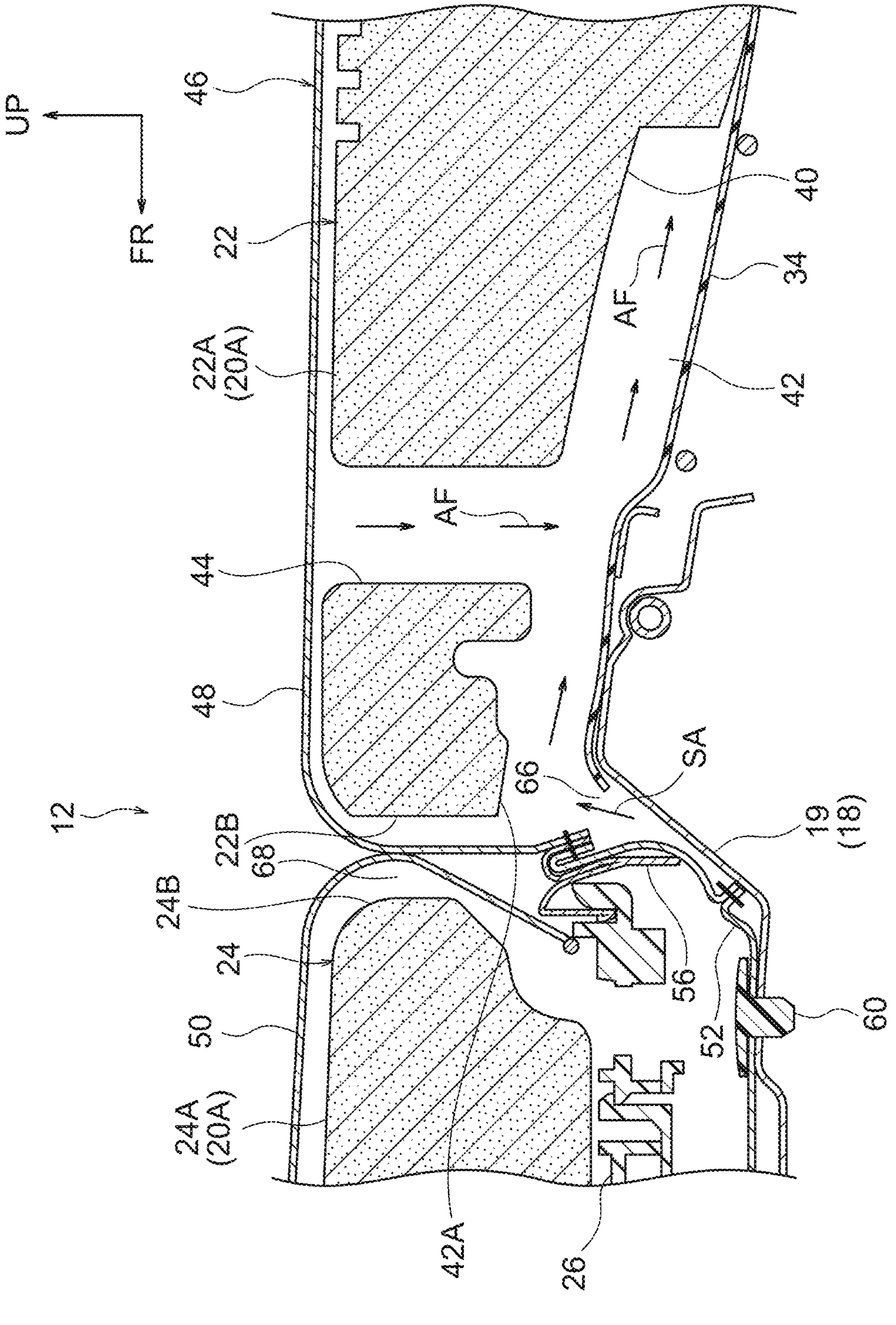
FIG. 9 is a cross-section corresponding to FIG. 6 and illustrating part of a seat cushion according to a comparative example.
Figure 10:
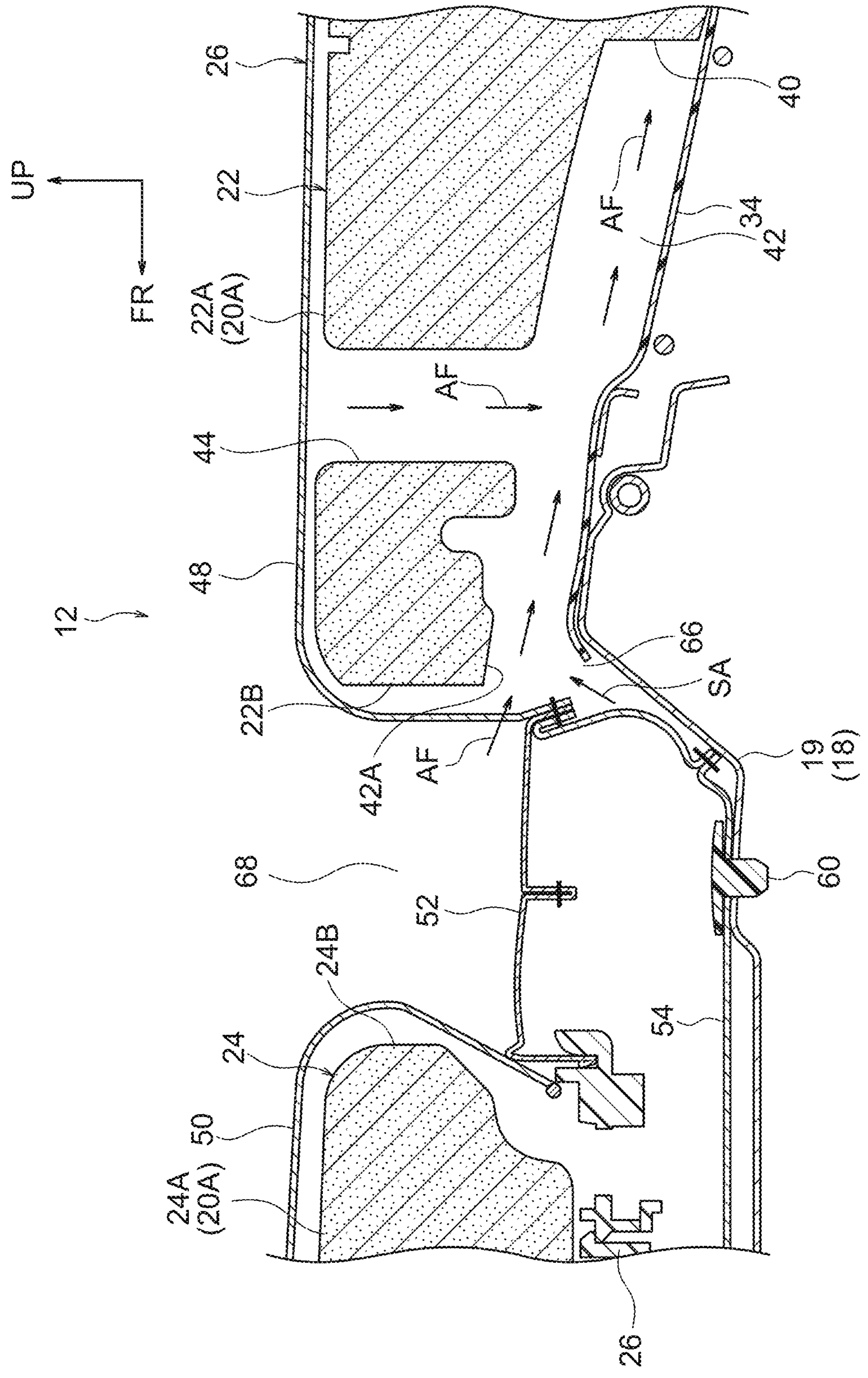
FIG. 10 is a cross-section corresponding to FIG. 7 and illustrating part of a seat cushion according to a comparative example.

Moreover, the seat cushion cover 46 includes the close-off cover portion 56 that blocks off the gap 66 between the end portion on the slide pad 24 side of the seal member 34 and the cover main body portion 48. This thereby enables unnecessary air movement through the gap 66 to be prevented. Namely, a secondary airflow is sucked inside the four flow paths 42 through the gap 66 (see arrow SA of FIG. 9 and FIG. 10) in cases in which the seat cushion cover 46 does not include a close-off cover portion 56, as illustrated in the comparative example of FIG. 9 and FIG. 10. As a result thereof, the volume of air drawn into the four flow paths from the occupant side falls with a deleterious effect to occupant comfort, however this can be avoided in the present exemplary embodiment.

Moreover, in the seat cushion cover 46 described above the front end portion of the close-off cover portion 56 is configured so as to be stitched together with the sewn seam 58 where the cover main body portion 48 and the movable cover portion 52 are stitched together, enabling a reduction in stitching work. Furthermore, the rear end portion of the close-off cover portion 56 is anchored to the wire 62 embedded in the pad main body 22 using the plural hog rings 64, enabling the rear end portion of the close-off cover portion 56 to be strongly anchored to the pad main body 22.

Figure 11:
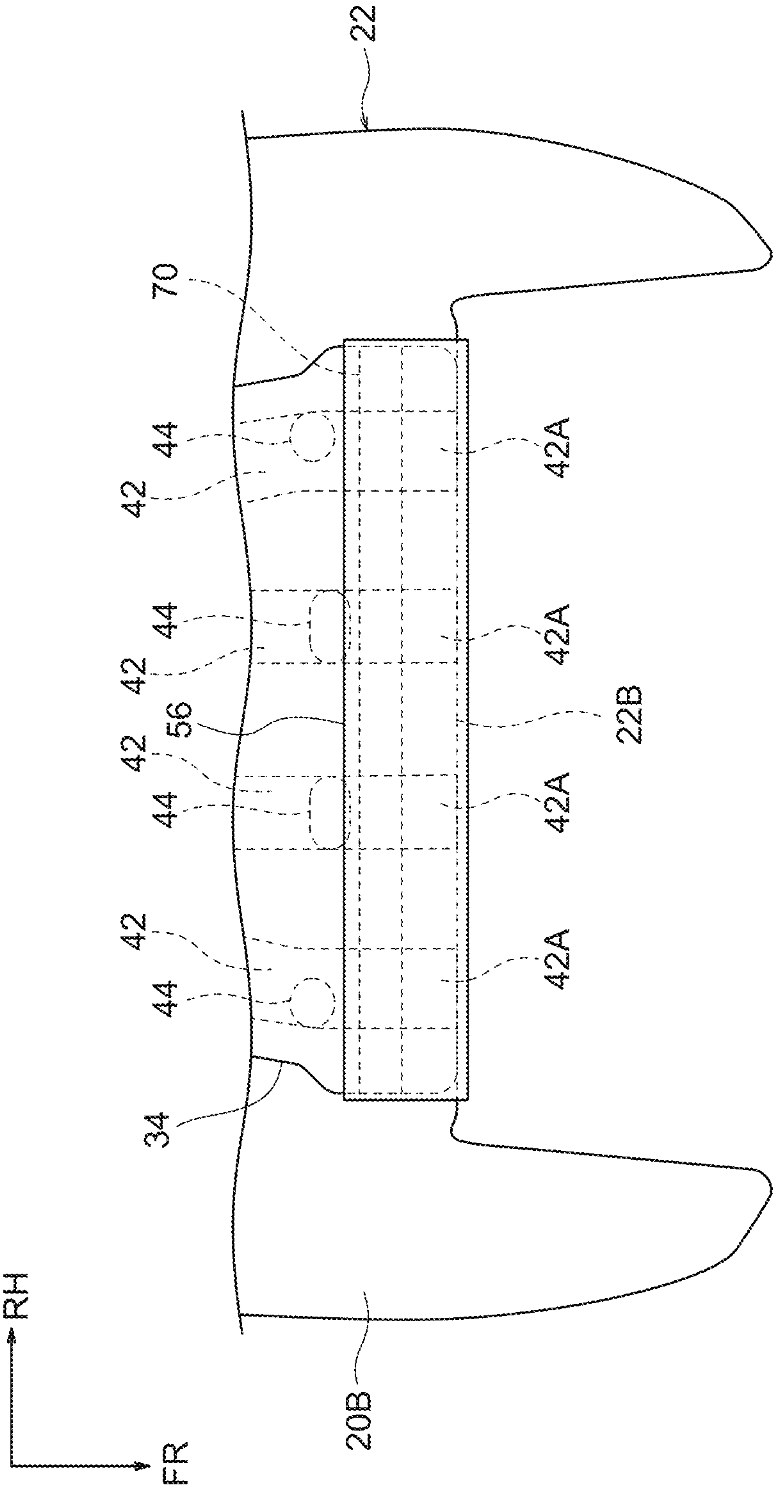
FIG. 11 is a bottom view corresponding to FIG. 8 and illustrating a modified example of an exemplary embodiment.

Note that although in the exemplary embodiment described above a configuration is adopted in which the rear end portion of the close-off cover portion 56 is anchored to the wire 62 using the plural hog rings 64, there is no limitation thereto. For example, a configuration such as that of the modified example illustrated in FIG. 11 may be adopted. In this modified example, the rear end portion of the close-off cover portion 56 is anchored to the front end portion of the seal member 34 using a surface fastener 70. In this modified example a task to anchor the rear end portion of the close-off cover portion 56 to the seal member 34 can be performed easily.

Moreover, although the exemplary embodiment described above, the close-off cover portion 56 is configured sewn to the cover main body portion 48, the movable cover portion 52, and the extension cover portion 54, there is no limitation thereto. The close-off cover portion 56 may be configured so as to be integrally formed to one or other of the cover main body portion 48, the movable cover portion 52, or the extension cover portion 54.

Moreover, although explanation of the above exemplary embodiment is of a case in which the seat cushion pad 20 serves as the pad of the present disclosure, a pad of the seatback 14 may serve as the pad of the present disclosure.

In addition various modifications may be implemented within a range not departing from the spirit of the present disclosure. Moreover, obviously the scope of rights of the present disclosure is not limited by the above exemplary embodiment.

What is claimed is:

1. A vehicle seat, comprising:

a pad main body configuring part of a pad that supports an occupant with a seating surface;

a slide pad that configures another part of the pad, and that approaches or moves away from the pad main body by sliding in a direction oriented along the seating surface;

a seal member that is provided on an opposite side of the pad main body from the seating surface, and that forms a flow path between the seal member and the pad main body reaching to an opposing face of the pad main body opposing the slide pad;

an air moving machine that moves air inside the flow path; and a cover that covers the pad main body and the slide pad, that includes a porous cover main body portion covering the pad main body, and a movable cover portion that is positioned between the pad main body and the slide pad and that is deformed by the sliding, wherein the cover includes a close-off cover portion that closes off a gap between an end portion on a slide pad side of the seal member and the cover main body portion, wherein the slide pad is disposed at a seat front side with respect to the pad main body, and the opposing face of the pad main body faces the seat front side.

2. The vehicle seat of claim 1, wherein a first end portion of the close-off cover portion is stitched together with a sewn seam where the cover main body portion and the movable cover portion are stitched together.

3. The vehicle seat of claim 1, wherein a second end portion of the close-off cover portion is anchored, using an anchor fixing, to a wire embedded in the pad main body.

4. The vehicle seat of claim 1, wherein a second end portion of the close-off cover portion is anchored, using a surface fastener, to the seal member.

5. The vehicle seat of claim 1, wherein the pad is a seat cushion pad provided at a seat cushion for supporting buttocks and thighs of a seated occupant, and the slide pad is disposed at a seat front side with respect to the pad main body, and slides along a seat front-rear direction with respect to the pad main body.

6. A vehicle seat, comprising:

a pad main body configuring part of a pad that supports an occupant with a seating surface;

a slide pad that configures another part of the pad, and that approaches or moves away from the pad main body by sliding in a direction oriented along the seating surface;

a seal member that is provided on an opposite side of the pad main body from the seating surface, and that forms a flow path between the seal member and the pad main body reaching to an opposing face of the pad main body opposing the slide pad;

an air moving machine that moves air inside the flow path; and a cover that covers the pad main body and the slide pad, that includes a porous cover main body portion covering the pad main body, and a movable cover portion that is positioned between the pad main body and the slide pad and that is deformed by the sliding, wherein the cover includes a close-off cover portion that closes off a gap between an end portion on a slide pad side of the seal member and the cover main body portion, wherein an end portion of the close-off cover portion is anchored, using an anchor fixing, to a wire embedded in the pad main body.

7. A vehicle seat, comprising:

a pad main body configuring part of a pad that supports an occupant with a seating surface;

a slide pad that configures another part of the pad, and that approaches or moves away from the pad main body by sliding in a direction oriented along the seating surface;

a seal member that is provided on an opposite side of the pad main body from the seating surface, and that forms a flow path between the seal member and the pad main body reaching to an opposing face of the pad main body opposing the slide pad;

an air moving machine that moves air inside the flow path; and a cover that covers the pad main body and the slide pad, that includes a porous cover main body portion covering the pad main body, and a movable cover portion that is positioned between the pad main body and the slide pad and that is deformed by the sliding, wherein the cover includes a close-off cover portion that closes off a gap between an end portion on a slide pad side of the seal member and the cover main body portion, wherein an end portion of the close-off cover portion is anchored, using a surface fastener, to the seal member.

* * * * *